United States Patent
Moatti et al.

(10) Patent No.: US 12,423,579 B2
(45) Date of Patent: Sep. 23, 2025

(54) REDUCTION OF DATA TRANSMISSION AND DATA STORAGE USING NEURAL NETWORK TECHNOLOGY

(71) Applicant: INTERNATIONAL BUSINESS MACHINES CORPORATION, Armonk, NY (US)

(72) Inventors: Yosef Moatti, Haifa (IL); Guy Khazma, Ramat Gan (IL); Paula Kim Ta-Shma, Tel Aviv-Jaffa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 628 days.

(21) Appl. No.: 17/935,183

(22) Filed: Sep. 26, 2022

(65) Prior Publication Data
US 2024/0104368 A1    Mar. 28, 2024

(51) Int. Cl.
*G06N 3/08*    (2023.01)
(52) U.S. Cl.
CPC ..................... *G06N 3/08* (2013.01)
(58) Field of Classification Search
CPC ........... G06N 3/08; G06N 3/045; G06N 3/084
See application file for complete search history.

(56) References Cited

U.S. PATENT DOCUMENTS

| 2019/0036716 A1* | 1/2019 | Kasaragod | ............ H04L 63/104 |
| 2020/0272899 A1 | 8/2020 | Dunne et al. | |

OTHER PUBLICATIONS

Alahmed, Atheer et al., "Machine Learning for Real-time Data Reduction in Cloud of Things," Oct. 13, 2020, 6 pages.
Ding, Xin et al., "CcGAN: Continuous Conditional Generative Adversarial Networks for Image Generation," Sep. 28, 2020, pp. 1-30.
Du, Bing et al., "Collaborative Image Compression and Classification with Multi-Task Learning for Visual Internet of Things," Chinese Journal of Aeronautics, Oct. 28, 2021, pp. 390-399.
Ferdowsi, Aidin et al., "Generative Adversarial Networks for Distributed Intrusion Detection in the Internet of Things," Jun. 3, 2019, 6 pages.
Goodfellow, Ian et al., "Generative Adversarial Nets," Jun. 10, 2014, pp. 1-9.

(Continued)

*Primary Examiner* — Etienne P Leroux
(74) *Attorney, Agent, or Firm* — Tihon Poltavets, Esq.; Blanche E. Schiller, Esq.; Heslin Rothenberg Farley & Mesiti P.C.

(57) ABSTRACT

A hub of a computing environment obtains a training set from an edge of the computing environment. The training set that is obtained includes data from the edge and is used to train a neural network at the hub. The training of the neural network provides a detector and a generator at the hub. A determination is made as to whether the training of the neural network is complete. Based on determining that the training of the neural network is complete, the detector is sent to the edge. The detector at the edge is to facilitate suppression of additional edge data to the hub based on the detector at the edge determining that the additional edge data is statistically similar, based on one or more selected criteria, to data used to train the neural network.

20 Claims, 8 Drawing Sheets

(56) References Cited

OTHER PUBLICATIONS

Karlsson, Anton et al., "Synthesis of Tabular Financial Data Using Generative Adversarial Networks," KTH Royal Institute of Technology, 2020 (no further date information available), pp. 1-68 (+ cover and i-v).
Karras, Tero et al., "Training Generative Adversarial Networks with Limited Data," 34th Conference on Neural Information Processing System, Oct. 7, 2020, pp. 1-37.
Liang, Fan et al., "Towards Edge-Based Deep Learning in Industrial Internet of Things," Jan. 1, 2022, pp. 1-13.
Lin, Jianhua et al., "Divergence Measures Based on the Shannon Entropy," IEEE Transactions on Information Theory, vol. 37, No. 1, Jan. 2001, p. 145.
Mirza, Mehdi et al., "Conditional Generative Adversarial Nets," Nov. 6, 2014, pp. 1-7.
Nobari, Amin Heyrani et al., "PcDGAN: A Continuous Conditional Diverse Generative Adversarial Network for Inverse Design," KDD '21, Aug. 2021, pp. 1-12.
Nuruyev, Tabriz, "GANS for Incremental Learning," Department of Control and Computer Engineering, Oct. 2021, pp. 1-69 (+ cover and i-vii).
Padji, Inkit et al., "Tabular Transformers for Modeling Multivariate Time Series," 2021 IEEE International Conference on Acoustics, Speech and Signal Processing (ICASSP), Nov. 2020, (Abstract Only).
Pan, Jing et al., "Adversarial Validation Approach to Concept Drift Problem in User Targeting Automation Systems at Uber," Jun. 26, 2020, pp. 1-6.
Park, H. et al., "MC-GAN: Multi-conditional Generative Adversarial Network for Image Synthesis," May 2018, pp. 1-13.
Rajabi, Amirarsalan et al., "TabFairGAN: Fair Tabular Data Generation with Generative Adversarial Networks," Sep. 2021, pp. 1-8.
Ramdas, Aaditya et al., "On Wasserstein Two Sample Testing and Related Families of Nonparametric Tests," Oct. 14, 2015, pp. 1-18.
Shafqat, Wafa et al., "A Hybrid GAN-based Approach to Solve Imbalanced Data Problems in Recommendation Systems," IEEE Access, Jan. 31, 2022, 1 page (Abstract Only).
Shah, Haseeb et al., "Distillation Techniques for Pseudo-rehearsal Based Incremental Learning," School of Electrical Engineering and Computer Science, National University of Science and Technology, Jul. 11, 2018, pp. 1-13.
Suprem, Abhijit et al., "ODIN: Automated Drift Detection and Recovery in Video Analytics," Proceedings of the VLDB Endowment, vol. 13, No. 11, Sep. 2020, pp. 2453-2465.
Wen, Bingyang et al., "Causal-TGAN: Generating Tabular Data Using Causal Generative Adversarial Networks," Apr. 2021, pp. 1-5.
Xu, Lei et al., "Synthesizing Tabular Data using Generative Adversarial Networks," Nov. 27, 2018, pp. 1-12.
Xu, Lei, "Synthesizing Tabular Data Using Conditional Gan," Massachusetts Institute of Technology, 2020 (no further date information available), pp. 1-93.
Zhang, Handuo et al., "Scenario Adaptive Edge Data Reduction," 2021 IEEE International Conference on Edge Computing (EDGE), Sep. 2021, pp. 9-16, (Abstract only).
Zhang, Xiongtao et al., "DANCE: Distributed Generative Adversarial Networks with Communication Compression," May 2022, Abstract Only, 1 page.

* cited by examiner

REDUCTION OF DATA TRANSMISSION AND DATA STORAGE USING NEURAL NETWORK TECHNOLOGY

BACKGROUND

One or more aspects relate, in general, to facilitating processing within a computing environment, and in particular, to reducing data transmission and data storage within such an environment.

Data generated at an edge of a computing environment (i.e., close to where the data is generated) may be transmitted to a central hub of the computing environment to undergo transformation and/or storage. The stored data may then be queried and/or analyzed. In such environments, there is a heavy burden on network bandwidth, analytics and storage, especially if a large amount of data or complex data is being transmitted, stored and/or analyzed.

Thus, processing within such environments, in which data is generated at one or more edges and transmitted across one or more networks to a central hub, is to be facilitated.

SUMMARY

Shortcomings of the prior art are overcome, and additional advantages are provided through the provision of a computer-implemented method of facilitating processing within a computing environment. The computer-implemented method includes obtaining, by a hub of the computing environment from an edge of the computing environment, a training set, the training set including data from the edge. The training set that is obtained is used to train a neural network at the hub, and the training of the neural network provides a detector and a generator at the hub. A determination is made as to whether the training of the neural network is complete. Based on determining that the training of the neural network is complete, the detector is sent to the edge. The detector at the edge is to facilitate suppression of transmission of additional edge data to the hub based on the detector at the edge determining that the additional edge data is statistically similar, based on one or more selected criteria, to data used to train the neural network.

Overall, data transmission to the hub and data storage at the hub are reduced (potentially greatly reduced), improving, at least, network bandwidth, storage requirements and system performance.

In one embodiment, the training of the neural network includes generating, using an in-training generator at the hub, synthetic data based, at least, on the training set. A decision is made, using an in-training detector at the hub, as to whether the synthetic data is acceptable based on one or more chosen criteria. Based on the deciding indicating that the synthetic data is acceptable, the training of the neural network provides the detector and the generator at the hub. By being able to generate acceptable synthetic data, synthetic data may be used to respond to queries rather than actual data, saving in data transmission, data storage and analytic time, thus, improving processing within a computing environment.

In one embodiment, the determining whether the training of the neural network is complete includes obtaining additional data at the edge and checking, using the detector at the hub, the data used to train the neural network with the additional data from the edge. Based on the detector at the hub determining that the data used to train the neural network is statistically indistinguishable based on a defined criterion from the additional data, the training of the neural network is complete. By completing the training of the neural network and generating acceptable synthetic data, synthetic data may be used to respond to queries rather than actual data, saving in data transmission, data storage and analytic time, thus, improving processing within a computing environment.

In one embodiment, the sending the detector to the edge includes sending one or more parameters describing the detector to the edge. The sending the detector to the edge allows the detector at the edge to facilitate suppression of transmission of edge data to the hub based on the detector at the edge determining that the current generator at the hub is still acceptable. The detector at the edge indicates that transmission of edge data to the hub is to be suppressed based on the detector at the edge validating that its associated generator is still valid to generate synthetic data statistically similar to the actual edge data. This saves on data transmission, data storage and processing time for analytic processing.

In one embodiment, metadata relating to the data obtained from the edge is stored. The metadata is to be used to create query-response synthetic data. This enables the transmission of edge data to be suppressed and reduces the storing of edge data, improving system performance.

In one aspect, one or more parameters of the neural network are stored. The one or more parameters of the neural network are to be used to re-create the neural network. By storing the parameters and recreating the neural network, synthetic data may be used to respond to queries rather than the edge data, reducing storage requirements and data transmission, and improving system performance.

In one aspect, a query is obtained and a set of generators to be used to respond to the query is determined. Based on the query and using the set of generators, query-response synthetic data to be used to respond to the query is generated. Results to the query are provided using the query-response synthetic data generated using the set of generators rather than data obtained at the edge. This reduces network bottlenecks, data storage at the hub and processing time, thus, improving system performance.

In one example, the neural network is a conditional-type neural network, and the generating the query-response synthetic data includes using at least one conditional-type neural network generator to generate the query-response synthetic data that meet one or more conditions. This allows the generation of specific relevant data.

In one aspect, the data from the edge is pre-processed to provide transformed data, and the training set is based on the transformed data. This provides data that may be more suitable, thus, improving processing time and system performance.

In one aspect, the obtaining the training set includes obtaining a plurality of training sets from a plurality of edges, and the training includes training a plurality of neural networks for the plurality of edges. This provides at least one neural network per edge.

Computer systems and computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In one or more aspects, a capability is provided to facilitate processing within a computing environment. The capability includes using neural network technology to reduce data transmission and data storage requirements in a computing environment. For example, neural network technology is used to reduce data transmission and data storage requirements in a computing environment that includes one or more edges (also referred to as edge points or end points) of a computing environment communicatively coupled to one or more hubs (e.g., central hubs) of the computing environment.

One example of neural network technology used is a generative adversarial network (GAN), which is a class of machine learning frameworks. For example, the generative adversarial network is a class of neural networks (e.g., artificial neural networks). It is used to generate synthetic data (e.g., tabular data) of a high quality. It is a machine teaming (MIL) model in which two neural networks (e.g., a generator and a detector) compete with each other to become more accurate in their predictions, i.e., in their generation of synthetic data. The data is synthetic in that it is not real (i.e., not actual data relating to a scenario, such as an event or anything that generates data) but is representative of actual data and is generated to a quality that statistically can be considered real.

In accordance with one or more aspects, one or more processes are provided that create a neural network training model that includes a generator to generate synthetic data and a detector that analyzes the synthetic data to determine the quality of the data. If the synthetic data is acceptable as a statistical representation of the real data (e.g., data related to a scenario generated at an edge and transmitted to the hub), then transmission of the real data is, at least, reduced (e.g., suppressed, stopped), as well as storage of that data. This reduces the use of system resources and increases system performance.

Figure 1A:
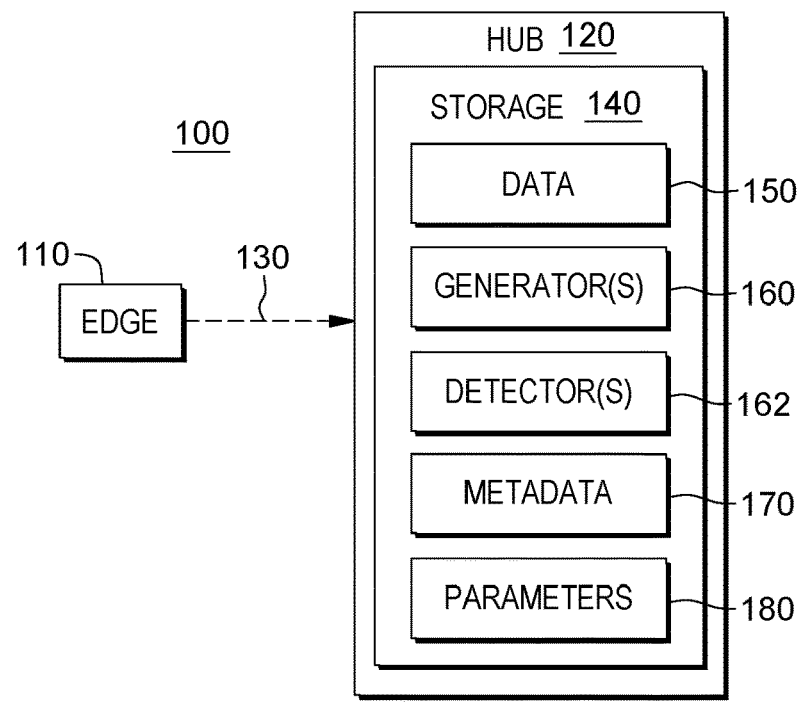
FIG. 1A depicts one example of a computing environment that includes an edge coupled to a hub, in accordance with one or more aspects of the present invention.

One example of a computing environment to incorporate, perform and/or use one or more aspects of the present invention is described with reference to FIG. 1A. As depicted, in one example, a computing environment 100 includes one or more edges 110 coupled to at least one hub 120 via one or more connections 130 (e.g., one or more networks, links, buses, other connections, etc.). An edge 110 includes, for instance, computing resources (e.g., hardware, such as sensors, monitors, devices, computer hardware, etc.; software; and/or firmware) to obtain (e.g., receive, pull, retrieve, be presented, generate, etc.) data of a selected scenario. As an example, the data is Internet of Things (IoT) data. For instance, the data may represent an amount of electricity used by a building; other data used or generated by a building; and/or data generated or used by other objects, etc. Many examples are possible and those listed herein are just a few examples. In one embodiment, an opt-in process is used prior to retrieval, generation, collection, storage, transmission and/or use of data, such that if a user or data provider does not opt-in and give permission, that data is not retrieved, generated, collected, stored, transmitted or used in connection with one or more aspects of the present invention.

The obtained data (referred to herein as edge data) is transmitted to a hub, such as hub 120, via one or more connections (e.g., connection 130). Hub 120 is, for instance, a central hub that may obtain data from one or more edges. In one example, the hub includes cloud computing and/or cloud storage, but this is only one example; other storage and/or resources may be used instead of and/or in addition to cloud storage and/or cloud computing. As an example, hub 120 includes storage 140 that stores data 150, such as data transmitted to the hub from one or more edges. Further, in accordance with one or more aspects of the present invention, hub 120 includes, for instance, one or more neural networks, such as one or more generators 160 and one or more detectors 162, as well as metadata 170 relating, e.g., to the edge data and/or a scenario, and parameters 180 describing the one or more neural networks. Hub 120 may include additional, fewer and/or other information.

In one or more aspects, hub 120 trains a neural network, such as a generative adversarial network (GAN), for an edge using transmitted edge data as a training set. The neural network includes, for instance, a generator (e.g., generator 160) and a detector (e.g., detector 162) that are built out of the training set. The generator (a neural network) is trained against the detector (a neural network). The generator generates, based on the training set, synthetic data statistically similar to the real data so that the detector is unable to detect, within, e.g., a predefined threshold, differences between the real and synthetic data. The generator strives to be as realistic as possible, and the detector strives at being able to distinguish between real data and synthetic data as much as possible.

To reduce (e.g., suppress) transmission of edge data from the edge to the hub and storage of the transmitted data at the hub, transmission of edge data from the edge to the hub is replaced with a check (e.g., periodic, continuous, at selected intervals, etc.) at the edge of whether the current neural network still fits the newly generated data at the edge. That is, the detector checks whether there has been a data distribution drift. For example, the detector determines whether the data currently obtained at the edge is statistically similar, based on one or more criteria (e.g., within a threshold or range), to the data used to train the neural network corresponding to the edge. If so, data storage of the edge data is replaced by storage of, for instance, metadata (e.g., metadata 170) of the scenario and/or parameters (e.g., parameters 180) of the neural network. The metadata includes, for instance, information regarding the edge data or the selected scenario, such as, e.g., generation of data at the edge was stopped for a period of time (e.g., due to an outage during the time interval of the neural network or some other event) or to describe other characteristics regarding the edge data. The parameters include, for instance, information to be used to recreate the generator and/or the detector. For instance, the parameters for the generator may include an identifier of the generator, a topology of the generator (e.g., number of layers, number of neurons per layer, weights of the neurons, and/or interconnections of the neurons, etc.), a time interval for the generator, and/or additional, less and/or other information to be used to recreate the generator. Further, the parameters for the detector may include an identifier of the detector, a topology of the detector (e.g., number of layers, number of neurons per layer, weights of the neurons, and/or interconnections of the neurons, etc.), a time interval for the detector, and/or additional, less and/or other information to be used to recreate the detector. Although in one embodiment, parameters are saved for both the generator and the detector, in other embodiments, parameters are saved for the generator but not the detector. Other variations are possible.

Figure 1B:
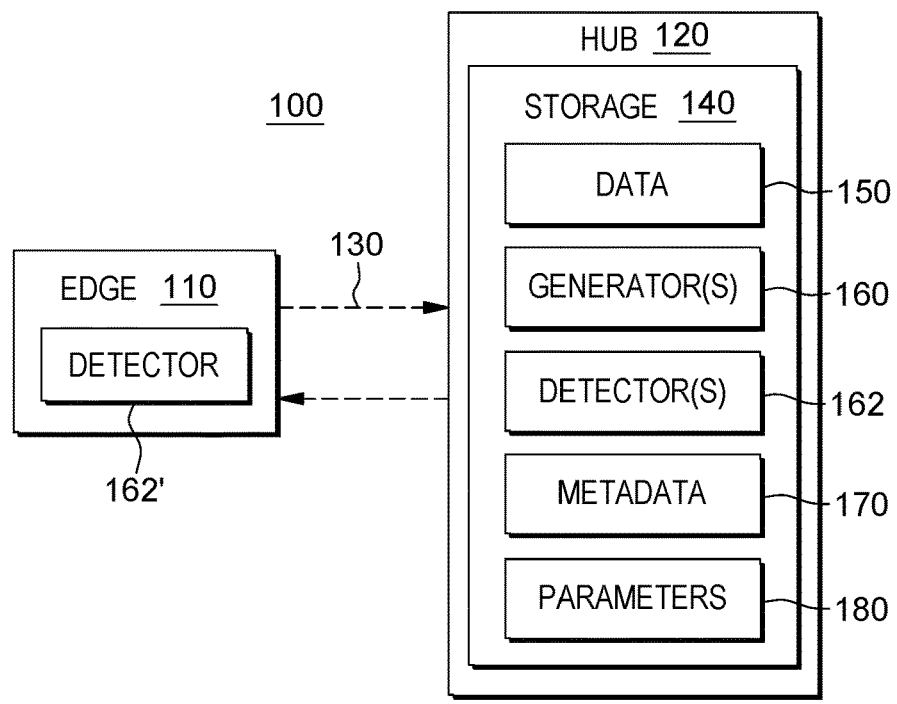
FIG. 1B depicts one example of further details of the edge of FIG. 1A, in accordance with one or more aspects of the present invention.

In one example, referring to FIG. 1B, to determine whether the current neural network still fits the newly generated data at the edge, a detector (e.g., detector 162) is sent to the edge (e.g., edge 110). This includes, for instance, providing (e.g., sending, copying or otherwise providing) to the edge parameters of the detector to be used to recreate the detector at the edge. The detector at the edge (e.g., detector 162') performs testing to ensure the newly generated data at the edge is statistically similar to the data used to train the neural network. For instance, if the detector determines that the newly received data is statistically different (e.g., within a probability that exceeds 50+δ %, wherein δ is delta), then further training of the neural network is to be performed (e.g., retrain the current neural network, begin creation and training of a new neural network, etc.).

In one or more aspects, processing oscillates between, for instance, an initialization state and a steady state. In the initialization state, a new neural network (e.g., a new generative adversarial network), as one example, is created at the hub that includes a generator neural network and a detector neural network. This neural network is trained in the initialization state to generate synthetic data similar to the actual currently generated data (i.e., the real data). (In another example, a previously created neural network is re-trained.) In the steady state, a check is made (e.g., periodically, continuously, at selected intervals, etc.) at the edge of whether the current neural network is still able to generate statistically accurate data. For instance, a detector at the edge determines whether the currently generated edge data is still statistically similar to the data used to train the neural network. Further details relating to the initialization and steady states are described with reference to FIGS. 2-6.

Figure 2:
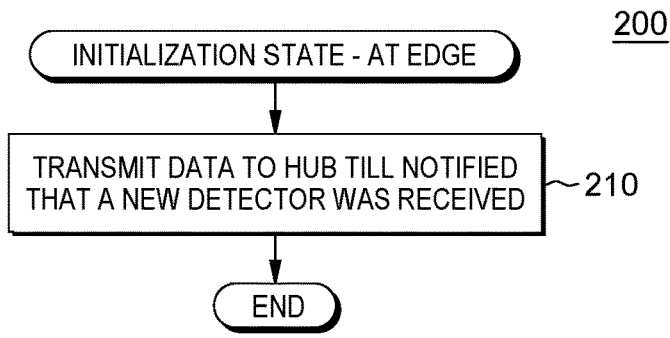
FIG. 2 depicts one example of initialization state processing at an edge within a computing environment, in accordance with one or more aspects of the present invention.

Referring to FIG. 2, in an initialization state at an edge (e.g., edge 110), the edge generates (or otherwise obtains) actual data, referred to herein as edge data, relating to a scenario (e.g., electrical usage at a building; other data for a building; other data for another scenario; etc.) and there is no trained neural network at the hub which can generate synthetic data similar to the edge data with sufficient statistical accuracy. In the initialization state, a process, such as process 200, transmits 210 edge data to a hub (e.g., hub 120). The data that is transmitted is data obtained (e.g., generated) at the edge for a selected scenario. For instance, the data, referred to as real data, may be Internet of Things data. In one example, all the data obtained for the scenario is sent; however, in other examples, a given percentage of randomly chosen data may be discarded if there are network bandwidth constraints, for instance. Other examples are also possible.

The data continues to be transmitted from the edge to the hub until, in one example, process 200 obtains an indication that a detector (e.g., detector 162') is received at the edge. That is, during initialization, a neural network is generated at the hub (e.g., hub 120) for the edge. In one example, at least one neural network, including a generator and a detector, is generated per edge. The generator created for an edge generates synthetic data representative of the edge data and the corresponding detector at the hub determines whether the synthetic data is acceptable (e.g., similar enough to the real data, based on, e.g., a threshold, range, other predefined criteria). Based on determining that the synthetic data is acceptable, the detector is sent to the edge (e.g., parameters of the detector are sent, copied or otherwise provided to the edge to enable the detector to be recreated at the edge). The receipt of the detector at the edge indicates that a neural network for the edge has been trained at the hub and that a generator is able to generate synthetic data that is statistically indistinguishable, within, e.g., threshold, range, etc., from the edge data.

Figure 3:
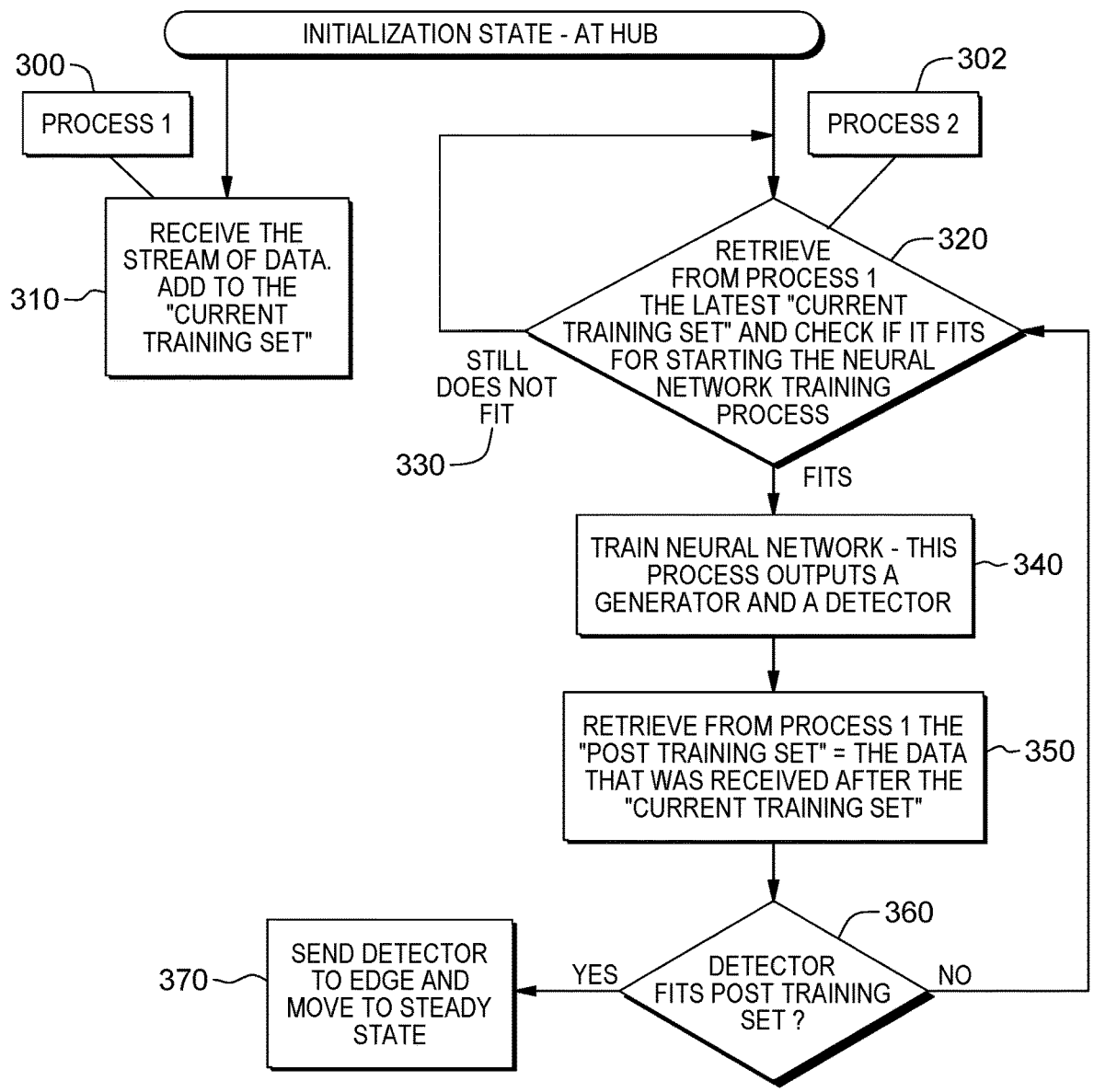
FIG. 3 depicts one example of initialization state processing at a hub within a computing environment, in accordance with one or more aspects of the present invention.

Additionally, referring to FIG. 3, initialization is performed at the hub (e.g., hub 120). In one embodiment, a process, such as a process 300 (e.g., process 1), receives 310 a stream of data transmitted by the edge (e.g., edge 110) and that data is added to a current training set. Further, in one example, a process, such as a process 302 (e.g., process 2), obtains 320 (e.g., retrieves, receives, copies, is provided) from process 1 the latest current training set (e.g., data (t0, t)) and checks if it is acceptable (fit) for starting the neural network training process. For instance, to test for fitness, one or more fitness criteria are used. As examples, the fitness criteria include:

i. Data size (it should be large enough—e.g., the minimum size would typically be set at a high mark when starting to handle the edges and then be progressively adjusted as neural network models are successfully produced for the edges).

ii. Statistical tests show that data (t0, t) is sufficiently homogeneous and stable with time so as to have a good chance of outputting a usable neural network. t1 designates the time for which the fitness criteria are found to be fulfilled.

In one example, the data of the training set is raw data. However, in other examples, the data may be transformed or pre-processed providing transformed data to be used as a basis for the training set. For instance, the raw data may be pre-processed (e.g., detect and remove IoT data records that come from mal-functioning IoT devices, etc.). This kind of transformation typically uses low resources and is possible at the edge or may be performed at the hub. The pre-processing of the data removes, e.g., oscillations between the steady-state and the initial state when the oscillations are due to, e.g., external reasons, such as IoT device hardware malfunctioning. Other examples are possible.

If during the check, process 2 determines 330 that additional training data is needed, then process 2 continues to obtain the data from process 1. However, if process 2 determines that the training set is acceptable, then process 2 trains 340 a new neural network (or re-trains an existing neural network), using the current training set (e.g., data (t0,t)). For instance, a generator, referred to as an in-training generator, generates synthetic data based on the current training set and the generated synthetic data is checked by a detector, referred to as an in-training detector, to determine whether the synthetic data is acceptable (e.g., statistically indistinguishable from the training set based on one or more criteria), resulting in a generator and a detector at the hub. As examples, the training may be started once t1 has been chosen or may be performed incrementally starting as early as to. The generator is to generate statistically similar data to the edge data so that the detector is mostly not able to distinguish between the real data and the generated synthetic data.

Further, in one embodiment, based on the neural network being trained using the current training set, incoming data from the edge is fed into the detector at the hub. If the detector determines that the newly received data is not similar enough to the data used to train the neural network (e.g., different with a probability that exceeds a threshold, e.g., 50+$\delta$ %, where $\delta$ is delta), then this neural network is not to be used and the control flow goes back to 320 to choose a new t1 (i.e., obtain a new training set or expand the current training set). As an example, process 2 retrieves 350 from process 1 post training set data, which is, e.g., the data received at the hub from the edge after the current training set data. Process 2 determines 360 whether the detector (at the hub) fits the post training set. That is, does the detector determine that the generated synthetic data is statistically indistinguishable from the post training set data or that the new data is statistically different from the training data? If the detector does not fit the post training set (e.g., synthetic data is unacceptable or the new obtained data is statistically different from the data used to train the neural network), then processing continues to retrieve 320 a new current training set (or additional data to expand the training set) from process 1 and the training continues. However, if the detector fits the post training set (e.g., synthetic data is acceptable or the new obtained data is statistically similar to the data used to train the neural network), then the training of the neural network is complete and the detector (e.g., parameters of the detector) is sent 370 to the edge (e.g., edge 110) and processing moves to the steady state.

In another embodiment, the training of the neural network is considered complete based on the output of the generator and the detector from the training and the additional processing at, e.g., 350 and 360 is not performed. Other variations are also possible.

Based on obtaining the detector at the edge (e.g., detector 162'), steady state processing begins in which the edge reduces (e.g., ceases, suppresses) data transmission of new real data (e.g., edge data generated or otherwise obtained at the edge) and instead, performs other processing. For instance, in one example, the edge begins buffering the data generated at the edge using, for instance, an application programming interface executed at the edge. If the size of the buffered data is larger than an input parameter, min, then the currently buffered data is returned for processing by the edge detector and the data buffer is re-initialized.

Figure 4:
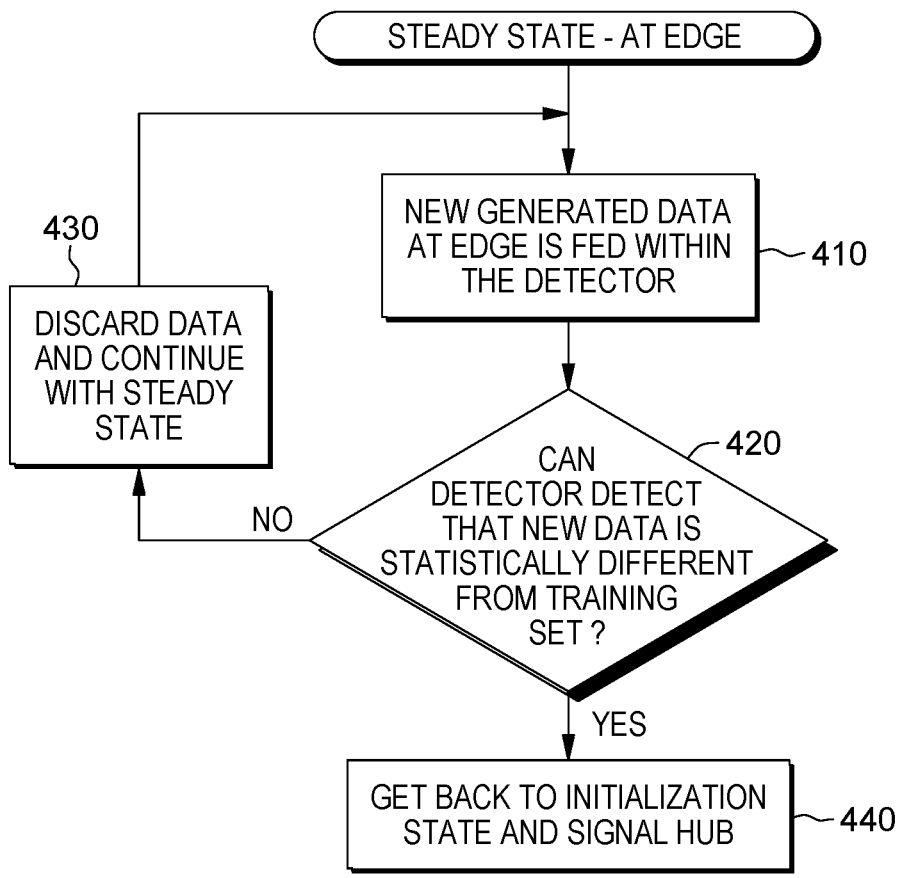
FIG. 4 depicts one example of steady state processing at an edge within a computing environment, in accordance with one or more aspects of the present invention.
Figure 5:
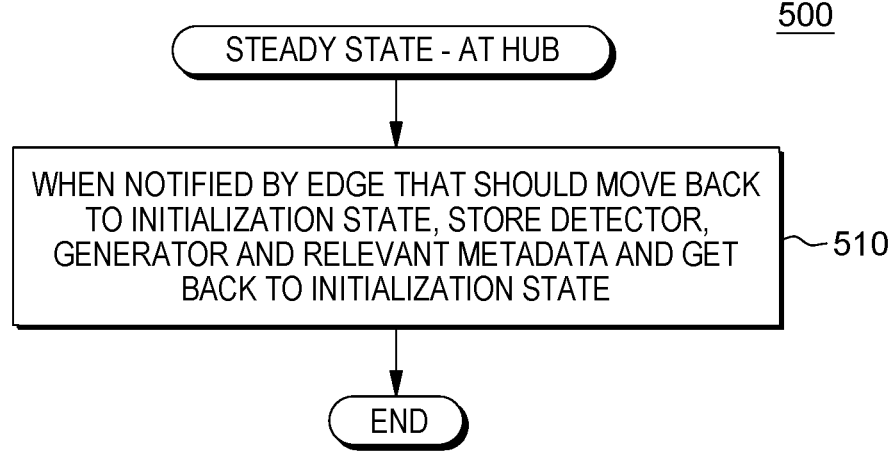
FIG. 5 depicts one example of steady state processing at a hub within a computing environment, in accordance with one or more aspects of the present invention.
Figure 6:
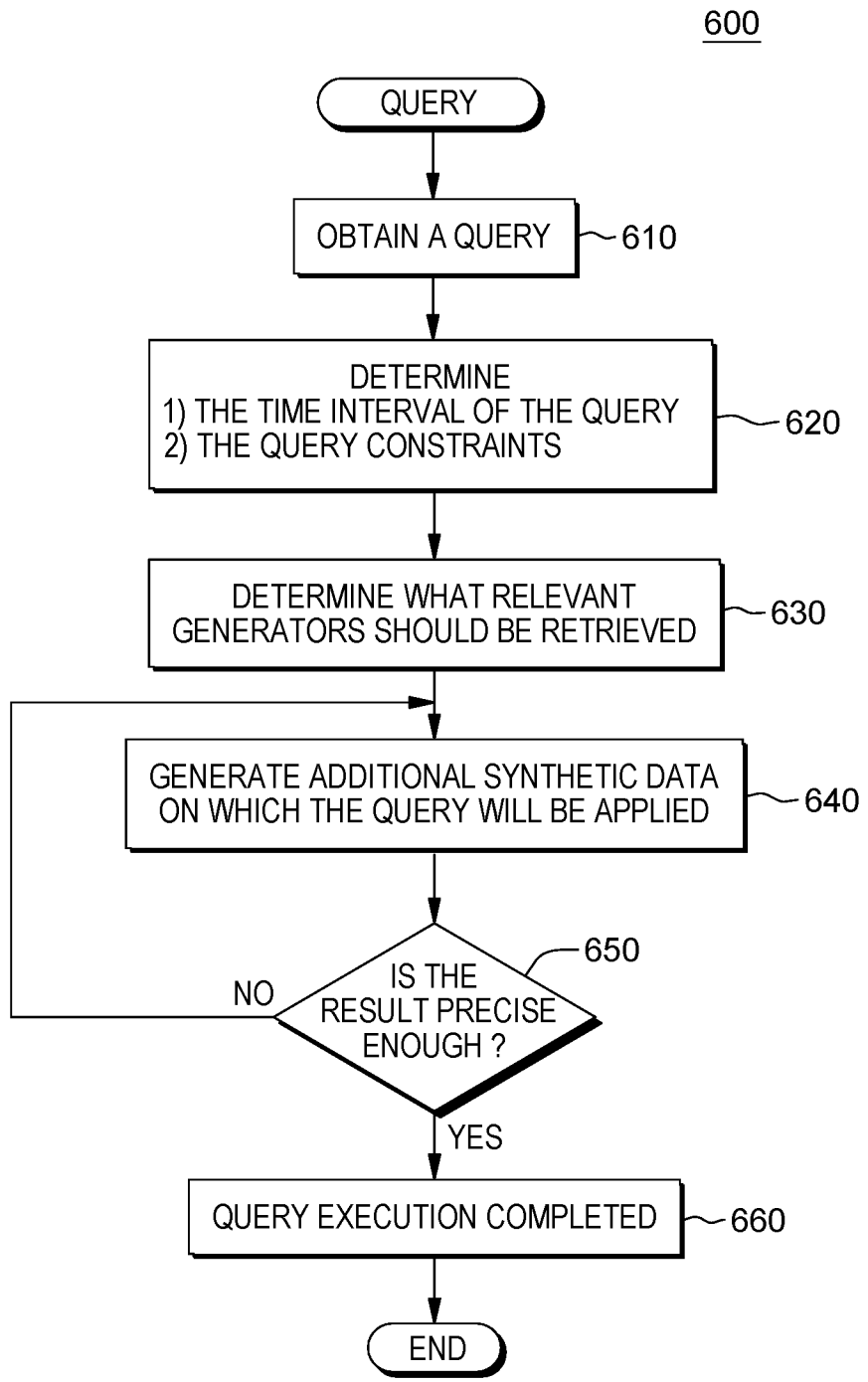
FIG. 6 depicts one example of query processing within a computing environment, in accordance with one or more aspects of the present invention.

Further, in one example, a next batch of edge data (e.g., the returned buffered data) is obtained by the detector at the edge, and if the detector determines that the newly obtained data is statistically different from the training set used to train the neural network (e.g., within a probability that exceeds, e.g., a threshold, such as 50+$\delta$ %), indicating that the detector is now able to statistically distinguish between the new generated data and the training set used to train the neural network, and therefore, the current generator and detector no longer represent the newly generated data, then processing returns to the initial state, in which a new neural network is created (e.g., a new generator and detector are provided at the hub or the current generator and detector at the hub are re-trained), as further described below with reference to FIGS. 4-5. In particular, FIG. 4 depicts one example of processing in the steady state at an edge, and FIG. 5 depicts one example of processing in the steady state at a hub.

Referring initially to FIG. 4, a process, e.g., a process 400, provides 410 newly generated (or otherwise obtained) data at the edge to the detector at the edge (e.g., detector 162') and checks 420 whether the detector determines that the new data is statistically different (within a threshold (e.g., 50+$\delta$ %) or range, etc.) from the training set used to train the neural network. If the new data is not statistically different, then process 400 discards 430 (e.g., deletes, removes, ignores, does not use, etc.) the new data and the steady state continues. However, if the new data is statistically different from the training set, then processing returns 440 to the initialization state and process 400 informs the hub of the same.

As examples, the edge data may be raw data or pre-processed/transformed data, as described herein.

Referring to FIG. 5, at the hub, processing remains in the steady state until a process, such as a process 500, is notified by the edge that processing should return to the initialization state. Based on this indication, process 500 stores 510 the generator (and optionally, the detector) and the relevant metadata (e.g., metadata 170; e.g., information relating to the data and/or scenario, such as an outage or other event) and returns to the initialization state. In one example, to store the generator (or detector), parameters (e.g., parameters 180) regarding the generator (or detector) are stored, such as id and/or topology of the generator (or detector) and/or any other information used to re-create the generator or detector. Processing returns to the initialization state, in which a new neural network is trained, or an existing neural network is re-trained.

In one or more aspects, the processing described herein may be used to reply to one or more queries requesting information (e.g., in big data analytics). One example of this processing is described with reference to FIG. 6. As an example, a process, e.g., process 600 (e.g., at the hub), obtains 610 a query, and based thereon, determines 620, for instance, a time interval of the query and/or any constraints of the query. Further, in one example, process 600 determines 630 the one or more relevant generators that are to be retrieved (e.g., recreated using one or more parameters). As an example, the generators that are retrieved depend on the data being requested (e.g., which edge), the time interval of the data, etc.

Process 600 instructs 640 at least one generator to generate synthetic data (e.g., query-response synthetic data) on which the query is to be applied. Process 600 determines 650 whether the result is precise enough (e.g., based on a mathematical model, a threshold, a range, etc.). If the result is not precise enough, then process 600 continues 640 with indicating that additional synthetic data is to be generated. However, if the result is precise enough, process 600 completes 660 the query execution and the query results, including query-response synthetic data, are provided to the query requestor. Thus, the amount of synthetic data generated is based on the desired precision and allows for a reduction in the amount of data to be analyzed. Further, synthetic data is used to respond to the query rather than actual edge data.

As described herein, in one or more embodiments, the processing is performed by and/or facilitated by one or more processes. Although various processes are described, the processing may be performed by additional, fewer and/or other processes. Further, the processing may be performed by computer resources other than and/or in addition to processes. The process(es) is (are) performed by one or more processors and/or other computer resources of a computing environment.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing a process (or multiple processes) that reduces data transmission and data storage using neural network technology, including, for instance, one or more processes that, e.g., train a neural network, synthetically generate data a hub, detect at an edge whether re-training of the neural network is to be performed, respond to queries and/or perform one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
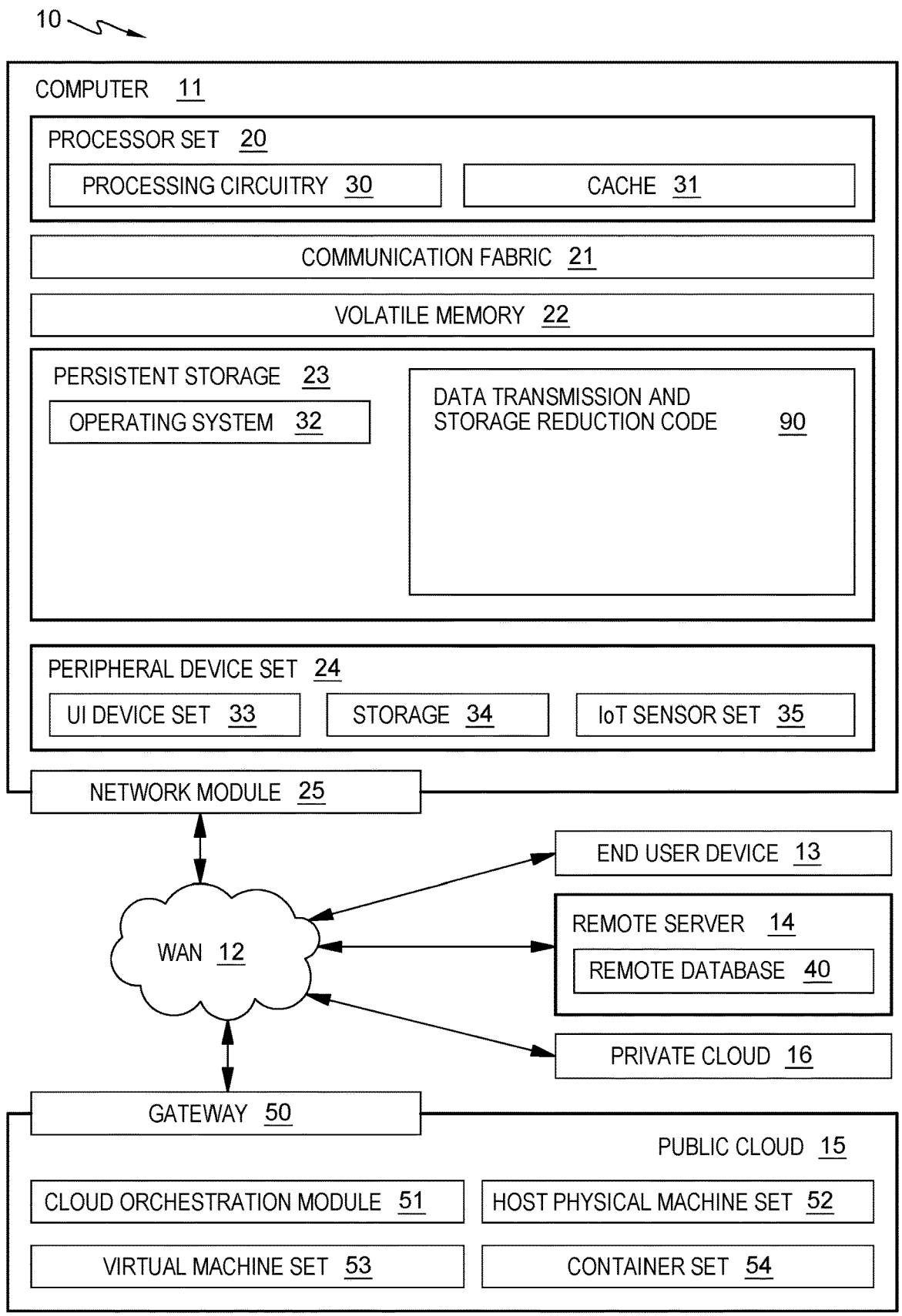
FIG. 7 depicts one example of a computing environment to perform, include and/or use one or more aspects of the present invention.

One example of a computing environment to perform, incorporate and/or use one or more aspects of the present invention is described with reference to FIG. 7. In one example, a computing environment 10 contains an example of an environment for the execution of at least some of the computer code involved in performing the inventive methods, such as data transmission and storage reduction code 90, including, for instance, one or more of processes 200, 300, 302, 400, 500 and 600. In addition to block 90, computing environment 10 includes, for example, computer 11, wide area network (WAN) 12, end user device (EUD) 13, remote server 14, public cloud 15, and private cloud 16. In this embodiment, computer 11 includes processor set 20 (including processing circuitry 30 and cache 31), communication fabric 21, volatile memory 22, persistent storage 23 (including operating system 32 and block 90, as identified above), peripheral device set 24 (including user interface (UI) device set 33, storage 34, and Internet of Things (IoT) sensor set 35), and network module 25. Remote server 14 includes remote database 40. Public cloud 15 includes gateway 50, cloud orchestration module 51, host physical machine set 52, virtual machine set 53, and container set 54.

Computer 11 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 40. As is well understood in the art of computer technology, and depending upon the technology, performance of a computer-implemented method may be distributed among multiple computers and/ or between multiple locations. On the other hand, in this presentation of computing environment 10, detailed discussion is focused on a single computer, specifically computer 11, to keep the presentation as simple as possible. Computer 11 may be located in a cloud, even though it is not shown in a cloud in FIG. 7. On the other hand, computer 11 is not required to be in a cloud except to any extent as may be affirmatively indicated.

Processor set 20 includes one, or more, computer processors of any type now known or to be developed in the future. Processing circuitry 30 may be distributed over multiple packages, for example, multiple, coordinated integrated circuit chips. Processing circuitry 30 may implement multiple processor threads and/or multiple processor cores. Cache 31 is memory that is located in the processor chip package(s) and is typically used for data or code that should be available for rapid access by the threads or cores running on processor set 20. Cache memories are typically organized into multiple levels depending upon relative proximity to the processing circuitry. Alternatively, some, or all, of the cache for the processor set may be located "off chip." In some computing environments, processor set 20 may be designed for working with qubits and performing quantum computing.

Computer readable program instructions are typically loaded onto computer 11 to cause a series of operational steps to be performed by processor set 20 of computer 11 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 31 and the other storage media discussed below. The program instructions, and associated data, are accessed by processor set 20 to control and direct performance of the inventive methods. In computing environment 10, at least some of the instructions for performing the inventive methods may be stored in block 90 in persistent storage 23.

Communication fabric 21 is the signal conduction paths that allow the various components of computer 11 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 22 is any type of volatile memory now known or to be developed in the future. Examples include dynamic type random access memory (RAM) or static type RAM. Typically, the volatile memory is characterized by random access, but this is not required unless affirmatively indicated. In computer 11, the volatile memory 22 is located in a single package and is internal to computer 11, but, alternatively or additionally, the volatile memory may be distributed over multiple packages and/or located externally with respect to computer 11.

Persistent storage 23 is any form of non-volatile storage for computers that is now known or to be developed in the future. The non-volatility of this storage means that the stored data is maintained regardless of whether power is being supplied to computer 11 and/or directly to persistent storage 23. Persistent storage 23 may be a read only memory (ROM), but typically at least a portion of the persistent storage allows writing of data, deletion of data and re-writing of data. Some familiar forms of persistent storage include magnetic disks and solid state storage devices. Operating system 32 may take several forms, such as various known proprietary operating systems or open source Portable Operating System Interface-type operating systems that employ a kernel. The code included in block 90 typically includes at least some of the computer code involved in performing the inventive methods.

Peripheral device set 24 includes the set of peripheral devices of computer 11. Data communication connections between the peripheral devices and the other components of computer 11 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 33 may include components such as a display screen, speaker, microphone, wearable devices (such as goggles and smart watches), keyboard, mouse, printer, touchpad, game controllers, and haptic devices. Storage 34 is external storage, such as an external hard drive, or insertable storage, such as an SD card. Storage 34 may be persistent and/or volatile. In some embodiments, storage 34 may take the form of a quantum computing storage device for storing data in the form of qubits. In embodiments where computer 11 is required to have a large amount of storage (for example, where computer 11 locally stores and manages a large database) then this storage may be provided by peripheral storage devices designed for storing very large amounts of data, such as a storage area network (SAN) that is shared by multiple, geographically distributed computers. IoT sensor set 35 is made up of sensors that can be used in Internet of Things applications. For example, one sensor may be a thermometer and another sensor may be a motion detector.

Network module 25 is the collection of computer software, hardware, and firmware that allows computer 11 to communicate with other computers through WAN 12. Network module 25 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 25 are performed on the same physical hardware device. In other embodiments (for example, embodiments that utilize software-defined networking (SDN)), the control functions and the forwarding functions of network module 25 are performed on physically separate devices, such that the control functions manage several different network hardware devices. Computer readable program instructions for performing the inventive methods can typically be downloaded to computer 11 from an external computer or external storage device through a network adapter card or network interface included in network module 25.

WAN 12 is any wide area network (for example, the internet) capable of communicating computer data over non-local distances by any technology for communicating computer data, now known or to be developed in the future. In some embodiments, the WAN 12 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 13 is any computer system that is used and controlled by an end user (for example, a customer of an enterprise that operates computer 11), and may take any of the forms discussed above in connection with computer 11. EUD 13 typically receives helpful and useful data from the operations of computer 11. For example, in a hypothetical case where computer 11 is designed to provide a recommendation to an end user, this recommendation would typically be communicated from network module 25 of computer 11 through WAN 12 to EUD 13. In this way, EUD 13 can display, or otherwise present, the recommendation to an end user. In some embodiments, EUD 13 may be a client device, such as thin client, heavy client, mainframe computer, desktop computer and so on.

Remote server 14 is any computer system that serves at least some data and/or functionality to computer 11. Remote server 14 may be controlled and used by the same entity that operates computer 11. Remote server 14 represents the machine(s) that collect and store helpful and useful data for use by other computers, such as computer 11. For example, in a hypothetical case where computer 11 is designed and programmed to provide a recommendation based on historical data, then this historical data may be provided to computer 11 from remote database 40 of remote server 14.

Public cloud 15 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 15 is performed by the computer hardware and/or software of cloud orchestration module 51. The computing resources provided by public cloud 15 are typically implemented by virtual computing environments that run on various computers making up the computers of host physical machine set 52, which is the universe of physical computers in and/or available to public cloud 15. The virtual computing environments (VCEs) typically take the form of virtual machines from virtual machine set 53 and/or containers from container set 54. It is understood that these VCEs may be stored as images and may be transferred among and between the various physical machine hosts, either as images or after instantiation of the VCE. Cloud orchestration module 51 manages the transfer and storage of images, deploys new instantiations of VCEs and manages active instantiations of VCE deployments. Gateway 50 is the collection of computer software, hardware, and firmware that allows public cloud 15 to communicate through WAN 12.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 16 is similar to public cloud 15, except that the computing resources are only available for use by a single enterprise. While private cloud 16 is depicted as being in communication with WAN 12, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 15 and private cloud 16 are both part of a larger hybrid cloud.

In one or more aspects, one or more processes are provided to facilitate processing within a computing environment. Data transmission from an edge of a computing environment to a hub of the computing environment and data storage at the hub are reduced by generating synthetic data at the hub that is statistically representative of edge data and using that data to answer queries, rather than actual edge data. This reduces the use of computer resources and improves system performance.

One or more of the processes used to generate data, check the data, enter an initialization state, enter a steady state, oscillate between the states and/or perform queries may use machine learning. For instance, machine learning may be used to build the training set; determine when to enter/leave the steady state; and/or perform other tasks of the process(es). A system is trained to perform analyses and learn from input data and/or choices made.

Figure 8:
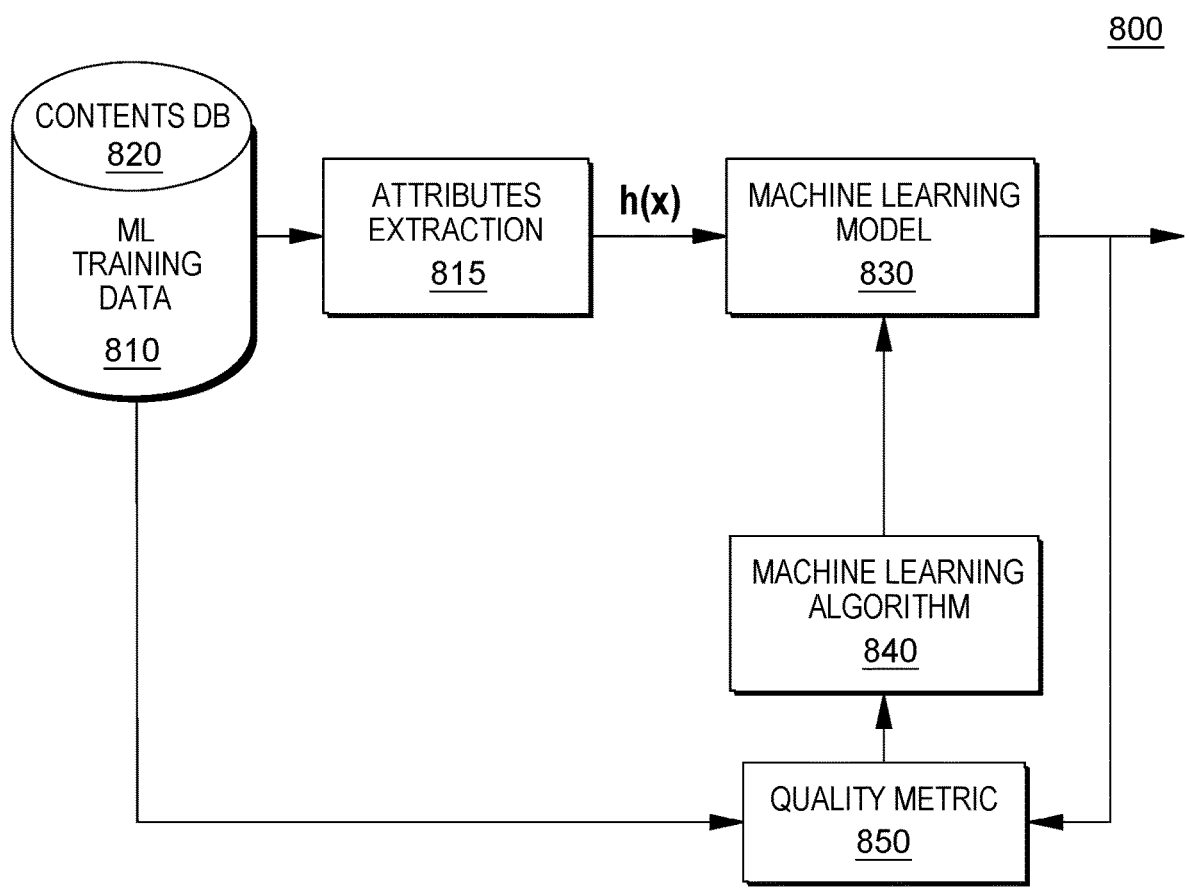
FIG. 8 depicts one example of a machine learning training system used in accordance with one or more aspects of the present invention.

FIG. 8 is one example of a machine learning training system 800 that may be utilized, in one or more aspects, to perform cognitive analyses of various inputs, including actual data from one or more sources, synthetically generated data, and/or other data. Training data utilized to train the model in one or more embodiments of the present invention includes, for instance, data that pertains to one or more events (e.g., scenarios), such as actually obtained data, and synthetically generated data, etc. The program code in embodiments of the present invention performs a cognitive analysis to generate one or more training data structures, including algorithms utilized by the program code to predict states of a given event. Machine learning (ML) solves problems that are not solved with numerical means alone. In this ML-based example, program code extracts various attributes from ML training data 810 (e.g., historical data or other data collected from various data sources relevant to the event), which may be resident in one or more databases 820 comprising event or scenario data and general data. Attributes 815 are utilized to develop a predictor function, h(x), also referred to as a hypothesis, which the program code utilizes as a machine learning model 830.

In identifying various event states, features, constraints and/or behaviors indicative of states in the ML training data 810, the program code can utilize various techniques to identify attributes in an embodiment of the present invention. Embodiments of the present invention utilize varying techniques to select attributes (elements, patterns, features, constraints, etc.), including but not limited to, diffusion mapping, principal component analysis, recursive feature elimination (a brute force approach to selecting attributes), and/or a Random Forest, to select the attributes related to various events. The program code may utilize a machine learning algorithm 840 to train the machine learning model 830 (e.g., the algorithms utilized by the program code), including providing weights for the conclusions, so that the program code can train the predictor functions that comprise the machine learning model 830. The conclusions may be evaluated by a quality metric 850. By selecting a diverse set of ML training data 810, the program code trains the machine learning model 830 to identify and weight various attributes (e.g., features, patterns, constraints) that correlate to various states of an event.

The model generated by the program code is self-learning as the program code updates the model based on active event feedback, as well as from the feedback received from data related to the event. For example, when the program code determines that the synthetically generated data is not statistically accurate, the program code utilizes a learning agent to update the model to reflect the state of the event, in order to improve predictions in the future. Additionally, when the program code determines that a prediction is incorrect, either based on receiving user feedback through an interface or based on monitoring related to the event, the program code updates the model to reflect the inaccuracy of the prediction for the given period of time. Program code comprising a learning agent cognitively analyzes the data deviating from the modeled expectations and adjusts the model to increase the accuracy of the model, moving forward.

In one or more embodiments, program code, executing on one or more processors, utilizes an existing cognitive analysis tool or agent to tune the model, based on data obtained from one or more data sources. One or more embodiments utilize, for instance, an IBM Watson® system as the cognitive agent. In one or more embodiments, the program code interfaces with IBM Watson Application Programming Interfaces (APIs) to perform a cognitive analysis of obtained data. Specifically, in one or more embodiments, certain of the APIs of the IBM Watson API comprise a cognitive agent (e.g., learning agent) that includes one or more programs, including, but not limited to, natural language classifiers, Retrieve and Rank (i.e., a service available through the IBM Watson Developer Cloud™ that can surface the most relevant information from a collection of documents), concepts/visual insights, trade off analytics, document conversion, and/or relationship extraction. In an embodiment, one or more programs analyze the data obtained by the program code across various sources utilizing one or more of a natural language classifier, retrieve and rank APIs, and trade off analytics APIs. The IBM Watson Application Program Interface (API) can also provide audio related API services, in the event that the collected data includes audio, which can be utilized by the program code, including but not limited to natural language processing, text to speech capabilities, and/or translation. IBM Watson® and IBM Watson Developer Cloud™ are registered trademarks or trademarks of International Business Machines Corporation in at least one jurisdiction.

In one or more embodiments, the program code utilizes a neural network to analyze event-related data to generate the model utilized to predict the state of a given event at a given time. Neural networks are a biologically inspired programming paradigm which enable a computer to learn and solve artificial intelligence problems. This learning is referred to as deep learning, which is a subset of machine learning, an aspect of artificial intelligence, and includes a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in multiple source processing, which the program code in one or more embodiments accomplishes when obtaining data and generating a model for predicting states of a given event.

As described herein, in one or more aspects, for a given edge, the system is in one of two possible states: a steady state where the neural network detector at the edge is unable to distinguish by more than, e.g., δ % new real data from the latest neural network training set, and an initial state where the neural network detector and generator have to be (re) created.

The system moves from the steady state to an initial state when the data distribution shift at the edge (as compared to the current training state) is large enough to be detected by the current detector, which moves the system to the initial state where the neural network is to be re-trained (or a new neural network created and trained). The training is performed, e.g., at the hub due to the computational strain it would place on the edge.

While the system stays in the steady state, the generator is known to still be good enough to simulate the newly generated data which permits the discarding of the newly generated data at the edge, thus gaining in data transmission, data pre-processing and storage savings. When the system moves to the initial state, the parameters of the previous generator (e.g., the time period during which this generator is valid, the topology of the generator, etc.) are stored with the relevant metadata (e.g., indication of an event, if any, that occurred during the time interval of the neural network), in place of storing the data that was generated from the start of the previous initial state till now (start of the new initial state period). Thus, in place of storing data, generators and optionally detectors (at least parameters of the generators and/or detectors) and/or metadata are periodically stored.

When, historic data is to be analyzed, the data that is to be analyzed is recreated with one or more generators which correspond to the targeted historical periods.

Further, in one example, conditional neural networks permit generation of data that corresponds to a given category (e.g., assume the training set comprises data that pertains to a multiplicity of categories, such as weekend-regular/middle-week-regular/special-sales for sales data categories; other examples are possible), which further renders possible the generation of specific data that pertains to a targeted category (e.g., assume that an analysis of regular weekend sales for period date x till date y is needed, then using the generators that cover this time period, data that pertains specifically to this category is able to be generated; other examples are possible).

Furthermore, multiple conditional neural networks may be used which widens the generation potential of the neural networks to multiple discrete parameters.

In addition, continuous conditional neural networks, i.e., conditional neural networks for which the generator receives as input continuous (instead of discrete for regular conditional neural networks) input, may be used. Through the usage of conditional-type neural networks (e.g., conditional and/or continuous conditional), acceleration of data analytics is provided, since tabular data may be generated that pertains to multiple conditions that pertain to a given data analysis (e.g., producing sale data for a specific item which would be a first categorical condition, within a specific price range which would be a continuous condition pertaining to a given period; other examples are possible).

One or more aspects of the present invention are tied to computer technology and facilitate processing within a computer, improving performance thereof. By having a capability that reduces the amount of data transmitted and stored, computing resources are saved, and performance is improved. A transmission bottleneck from the edge to the hub is, at least, minimized, and the burden of storing huge quantities of data is, at least, reduced. Further, by having a capability that automatically oscillates between an initialization state and a steady state, efficiencies in processing are provided, saving system resources and improving performance. The analytics overhead induced by reading potentially a large amount of data produced at the edge is also reduced. The above improves processing within a processor, computer system and/or computing environment.

Further details of one embodiment of facilitating processing within a computing environment, as it relates to one or more aspects of the present invention, are described with reference to FIGS. 9A-9B.

Figure 9A:
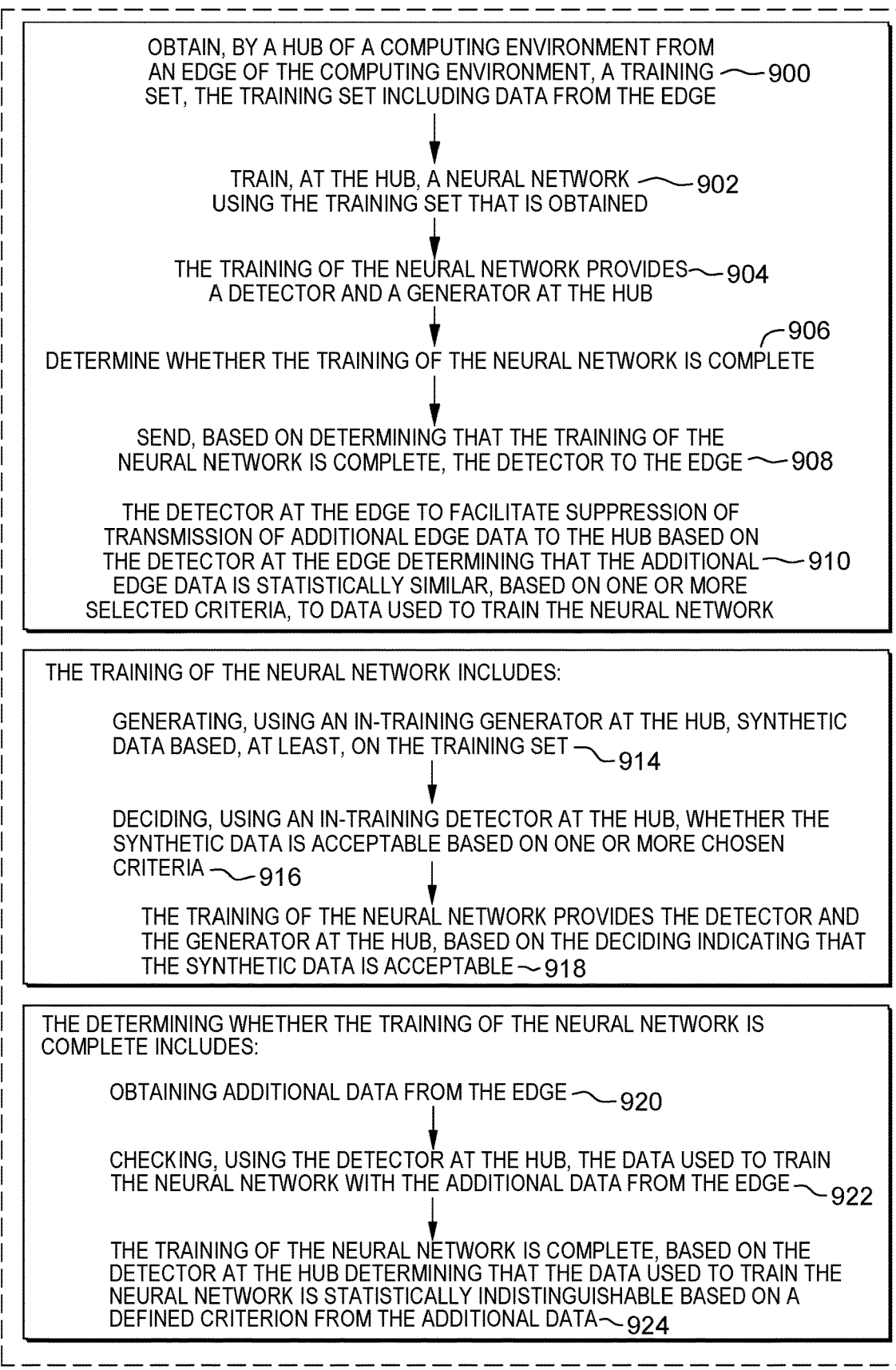
FIGS. 9A-9B depict one example of facilitating processing within a computing environment, as it relates to one or more aspects of the present invention.

Referring to FIG. 9A, in one embodiment, a training set is obtained 900 by a hub of a computing environment from an edge of the computing environment. Using the training set that is obtained, which includes data from the edge, a neural network is trained 902, at the hub. The training of the neural network provides 904 a detector and a generator at the hub. A determination is made 906 as to whether the training of the neural network is complete. Based on determining that the training of the neural network is complete, the detector is sent 908 to the edge. The detector at the edge is to facilitate suppression 910 of transmission of additional edge data to the hub based on the detector at the edge determining that the additional edge data is statistically similar, based on one or more selected criteria, to data used to train the neural network. Overall, data transmission to the hub and data storage at the hub are reduced (potentially greatly reduced), improving at least, network bandwidth, storage requirements and system performance.

In one embodiment, the training of the neural network includes generating 914, using an in-training generator at the hub, synthetic data based, at least, on the training set. A decision 916 is made, using an in-training detector at the hub, as to whether the synthetic data is acceptable based on one or more chosen criteria. Based on the deciding indicating that the synthetic data is acceptable, the training of the neural network provides 918 the detector and the generator at the hub.

As an example, the determining whether the training of the neural network is complete includes obtaining 920 additional data from the edge and checking 922, using the detector at the hub, the data used to train the neural network with the additional data from the edge. The training of the neural network is complete 924 based on the detector at the hub determining that the data used to train the neural network is statistically indistinguishable based on a defined criterion from the additional data. By generating acceptable synthetic data and completing training of the neural network at the hub, synthetic data may be used to respond to queries rather than actual data, saving in data transmission, data storage and analytic time, thus, improving processing within a computing environment.

Figure 9B:
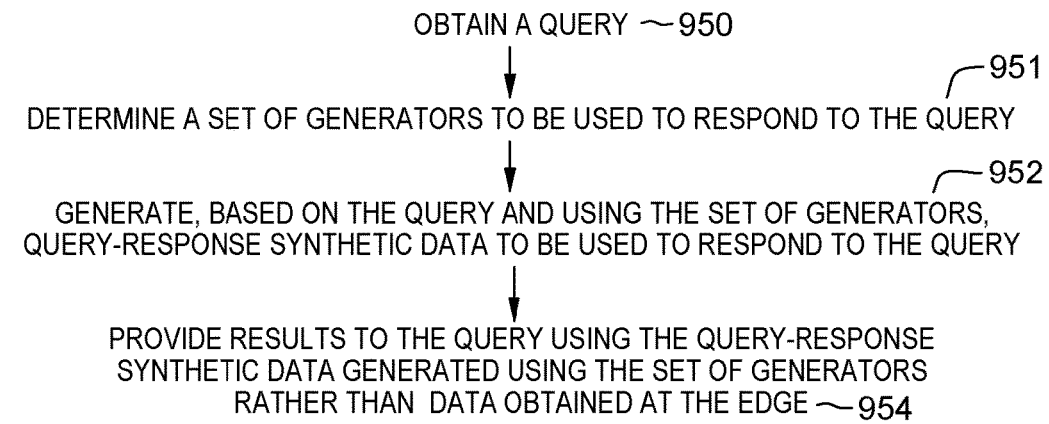

In one aspect, referring to FIG. 9B, the sending 930 the detector to the edge includes sending one or more parameters describing the detector to the edge. The sending the detector to the edge allows the detector at the edge to facilitate suppression of transmission of edge data to the hub based on the detector at the edge determining that the current generator at the hub is still acceptable. The detector at the edge indicates that transmission of edge data to the hub is to be suppressed based on the detector at the edge validating that its associated generator is still valid to generate synthetic data statistically similar to the actual edge data. This validation is obtained by, e.g., feeding the new edge data into the detector at the edge and checking that the new edge data can still be considered as statistically similar to the training set. This saves on data transmission, data storage and processing time for analytic processing.

In one aspect, metadata relating to the data obtained from the edge is stored 940 and that metadata is to be used to create query-response synthetic data. This enables the transmission of edge data to be suppressed and saves the storing of edge data, improving system performance.

In one aspect, one or more parameters of the neural network to be used to re-create the neural network are stored 945. By storing the parameters and recreating the neural network, synthetic data may be used to respond to queries rather than the edge data, reducing storage requirements, and improving system performance.

In one aspect, a query is obtained 950 and a set of generators to be used to respond to the query is determined 951. Based on the query and using the set of generators, query-response synthetic data to be used to respond to the query is generated 952. Results to the query are provided 954 using the query-response synthetic data generated using the set of generators rather than data obtained at the edge. This reduces network bottlenecks, data storage at the hub and processing time, thus, improving system performance.

In one example, the neural network is, e.g., a conditional-type neural network, and the generating 956 the query-response synthetic data includes using at least one conditional-type neural network generator to generate the query-response synthetic data that meet one or more conditions. This allows the generation of specific relevant data.

In one aspect, the data from the edge is pre-processed 960 to provide transformed data, and the training set is based on the transformed data 962. This provides data that may be more suitable, thus, improving processing time and system performance.

In one aspect, the obtaining the training set includes obtaining 970 a plurality of training sets from a plurality of edges, and the training includes training a plurality of neural networks for the plurality of edges. This provides at least one neural network per edge.

Other aspects, variations and/or embodiments are possible.

The computing environments described herein are only examples of computing environments that can be used. Other environments may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to provide one or more processes to generate synthetic data that is statistically real, detect whether the synthetic data is acceptable, answer queries based on the synthetic data, oscillate between an initialization state and steady state to improve a training set used to generate the synthetic data, reduce data transmission and data storage and/or to perform to one or more other aspects of the present invention.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of neural networks may be considered. Further, other scenarios may be contemplated. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
   obtaining, by a hub of the computing environment from an edge of the computing environment, a training set, the training set including data from the edge;
   training, at the hub, a neural network using the training set that is obtained, the training of the neural network providing a detector and a generator at the hub;
   determining whether the training of the neural network is complete; and
   sending, based on determining that the training of the neural network is complete, the detector to the edge, the detector at the edge to facilitate suppression of transmission of additional edge data to the hub based on the detector at the edge determining that the additional edge data is statistically similar, based on one or more selected criteria, to data used to train the neural network.

2. The computer-implemented method of claim 1, wherein the training of the neural network includes:
   generating, using an in-training generator at the hub, synthetic data based, at least, on the training set; and
   deciding, using an in-training detector at the hub, whether the synthetic data is acceptable based on one or more chosen criteria, wherein the training of the neural network provides the detector and the generator at the hub, based on the deciding indicating that the synthetic data is acceptable.

3. The computer-implemented method of claim 1, wherein the determining whether the training of the neural network is complete comprises:
   obtaining additional data from the edge; and
   checking, using the detector at the hub, the data used to train the neural network with the additional data from the edge, wherein the training of the neural network is complete based on the detector at the hub determining that the data used to train the neural network is statistically indistinguishable based on a defined criterion from the additional data.

4. The computer-implemented method of claim 1, wherein the sending the detector to the edge comprises sending one or more parameters describing the detector to the edge.

5. The computer-implemented method of claim 1, further comprising storing metadata relating to the data obtained from the edge, the metadata to be used to create query-response synthetic data.

6. The computer-implemented method of claim 1, further comprising storing one or more parameters of the neural network, the one or more parameters of the neural network to be used to re-create the neural network.

7. The computer-implemented method of claim 1, further comprising:
   obtaining a query;
   determining a set of generators to be used to respond to the query;
   generating, based on the query and using the set of generators, query-response synthetic data to be used to respond to the query; and
   providing results to the query using the query-response synthetic data generated using the set of generators rather than data obtained at the edge.

8. The computer-implemented method of claim 7, wherein the neural network is a conditional-type neural network, and wherein the generating the query-response synthetic data includes using at least one conditional-type neural network generator to generate the query-response synthetic data that meet one or more conditions.

9. The computer-implemented method of claim 1, further comprising pre-processing the data from the edge to provide transformed data, wherein the training set is based on the transformed data.

10. The computer-implemented method of claim 1, wherein the obtaining the training set comprises obtaining a plurality of training sets from a plurality of edges, and wherein the training includes training a plurality of neural networks for the plurality of edges.

11. A computer system for facilitating processing within a computing environment, the computer system comprising:

a memory; and
one or more processors in communication with the memory, wherein the computer system is configured to perform a method, said method comprising:
obtaining, by a hub of the computing environment from an edge of the computing environment, a training set, the training set including data from the edge;
training, at the hub, a neural network using the training set that is obtained, the training of the neural network providing a detector and a generator at the hub;
determining whether the training of the neural network is complete; and
sending, based on determining that the training of the neural network is complete, the detector to the edge, the detector at the edge to facilitate suppression of transmission of additional edge data to the hub based on the detector at the edge determining that the additional edge data is statistically similar, based on one or more selected criteria, to data used to train the neural network.

12. The computer system of claim 11, wherein the training of the neural network includes:
generating, using an in-training generator at the hub, synthetic data based, at least, on the training set; and
deciding, using an in-training detector at the hub, whether the synthetic data is acceptable based on one or more chosen criteria, wherein the training of the neural network provides the detector and the generator at the hub, based on the deciding indicating that the synthetic data is acceptable.

13. The computer system of claim 11, wherein the method further comprises storing one or more parameters of the neural network, the one or more parameters of the neural network to be used to re-create the neural network.

14. The computer system of claim 11, wherein the method further comprises:
obtaining a query;
determining a set of generators to be used to respond to the query;
generating, based on the query and using the set of generators, query-response synthetic data to be used to respond to the query; and
providing results to the query using the query-response synthetic data generated using the set of generators rather than data obtained at the edge.

15. The computer system of claim 14, wherein the neural network is a conditional-type neural network, and wherein the generating the query-response synthetic data includes using at least one conditional-type neural network generator to generate the query-response synthetic data that meet one or more conditions.

16. A computer program product for facilitating processing within a computing environment, said computer program product comprising:

one or more computer readable storage media and program instructions collectively stored on the one or more computer readable storage media readable by at least one processing circuit to perform a method comprising:
obtaining, by a hub of the computing environment from an edge of the computing environment, a training set, the training set including data from the edge;
training, at the hub, a neural network using the training set that is obtained, the training of the neural network providing a detector and a generator at the hub;
determining whether the training of the neural network is complete; and
sending, based on determining that the training of the neural network is complete, the detector to the edge, the detector at the edge to facilitate suppression of transmission of additional edge data to the hub based on the detector at the edge determining that the additional edge data is statistically similar, based on one or more selected criteria, to data used to train the neural network.

17. The computer program product of claim 16, wherein the training of the neural network includes:
generating, using an in-training generator at the hub, synthetic data based, at least, on the training set; and
deciding, using an in-training detector at the hub, whether the synthetic data is acceptable based on one or more chosen criteria, wherein the training of the neural network provides the detector and the generator at the hub, based on the deciding indicating that the synthetic data is acceptable.

18. The computer program product of claim 16, wherein the method further comprises storing one or more parameters of the neural network, the one or more parameters of the neural network to be used to re-create the neural network.

19. The computer program product of claim 16, wherein the method further comprises:
obtaining a query;
determining a set of generators to be used to respond to the query;
generating, based on the query and using the set of generators, query-response synthetic data to be used to respond to the query; and
providing results to the query using the query-response synthetic data generated using the set of generators rather than data obtained at the edge.

20. The computer program product of claim 19, wherein the neural network is a conditional-type neural network, and wherein the generating the query-response synthetic data includes using at least one conditional-type neural network generator to generate the query-response synthetic data that meet one or more conditions.

\* \* \* \* \*